April 20, 1965 R. SIGRIST 3,179,134
PNEUMATIC FILLING APPARATUS FOR EXPANDED POLYSTYRENE
Filed Jan. 28, 1963

INVENTOR:
ROBERT SIGRIST

United States Patent Office 3,179,134
Patented Apr. 20, 1965

3,179,134
PNEUMATIC FILLING APPARATUS FOR
EXPANDED POLYSTYRENE
Robert Sigrist, 13 Rue Marx Dormoy, Marseille, France
Filed Jan. 28, 1963, Ser. No. 254,089
Claims priority, application France, Feb. 2, 1962, 19,614
3 Claims. (Cl. 141—67)

The invention relates to a metering device for the automatic filling of a mould intended for the shaping of objects from expanded polystyrene.

According to the present invention, a metering device for the automatic filling of a mould with expanded polystyrene comprises an injection chamber including an inlet and an outlet for the moulding material, said injection chamber having a storing space into which the inlet opens and a metering space out of which the outlet opens, said metering space having an inlet for compressed fluid, a first valve movable in the injection chamber and capable of closing off the metering space from the storing space, a second valve for closing the outlet of the metering space when said space is in communication with the storing space and for opening said outlet when the metering space is closed off from the storing space, means constituting a direct coupling betwen said first and second valve to ensure their simultaneous operation, and a third valve for admission of fluid under pressure to the inlet of the metering space, said third valve being arranged to open when the first valve has closed off the metering space from the storage space.

In a preferred embodiment, the first and second valves have a common operating rod to ensure their simultaneous operation, and a lost-motion coupling is provided between said common operating rod and said third valve, the latter being arranged to open when said first valve has closed off the metering space from the storage space.

For operation of the valves there may be provided a cylinder having an inlet port and an exhaust port for compressed fluid, and a piston movable along said cylinder and coupled to the common operating rod, the third valve being movable within said cylinder for closing and opening the fluid inlet of the metering space.

The accompanying drawing shows, by way of example and not in limitation thereof, an embodiment of the invention.

Figure 1:
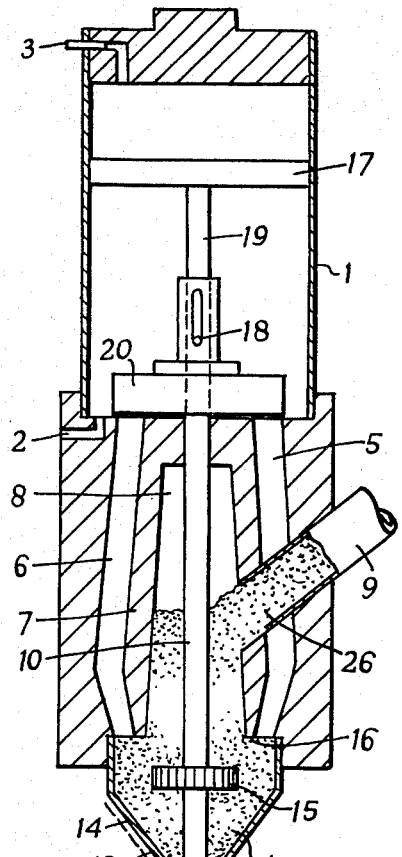
FIG. 1 shows the device in longitudinal section, in its "stop" position.
Figure 2:
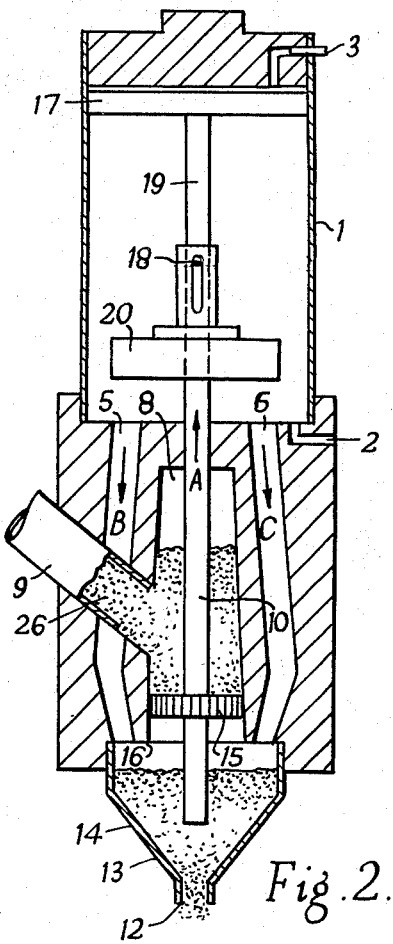
FIG. 2 is a sectional view of the same device in its operating position.
Figure 3:
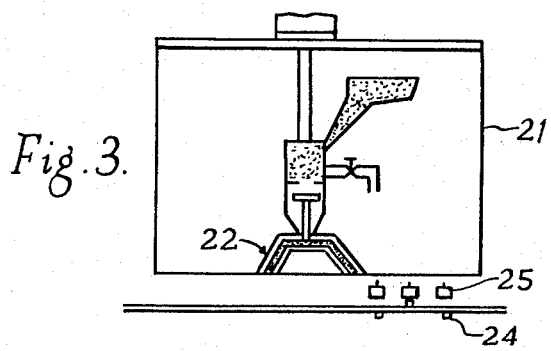
FIG. 3 is a schematical representation of the device in its entirety.

The device shown in FIG. 1 comprises a cylinder 1 receiving the pressure fluid through an inlet orifice 2 and having an exhaust 3.

The base of this cylinder communicates with a metering space 4 of an injection chamber 7 through the conduits 5, 6, said chamber 7 being provided with an axially directed storing space 8 intended to receive the polystyrene from the feed hopper through an inlet conduit 9.

Into the axis of this assembly is mounted a common operating rod 10, of which the lower extremity 11 constitutes a second valve which can close an outlet 12 located at the base of the conical body 13 which holds a volume of cooling water between its double walls 14.

On this rod 10, there is mounted a first valve 15 intended to close the outlet opening 16 of the storing space 8.

The upper extremity of said rod carries a piston 17 sliding in the cylinder 1.

A lug 18 is fixed on this rod, said lug sliding in a groove of the tubular shaft 19 integral with a third valve 20 serving for closing the conduits 5 and 6.

The device is mounted vertically on a frame 21 above a mould 22. An automatic control device 24 having a camshaft and contacts 25 controls the movements of the piston rod and of the air inlets 2, 3.

In the position where the chamber is being filled with the expanded polystyrene 26, the valve 20 rests on the orifices of the conduits 5 and 6 which form its seat. The granular material fills the entire volume of the metering space 4 by gravity.

As soon as the required amount is reached, the rod 10 ascends in the direction indicated by the arrow A. This ascension is effected in two stages. First, the valve 15 closes the opening 16 and opens the injection outlet 12; hereafter, it continues its ascension until the lug 18 reaches the upper end of the groove 19 and lifts the third valve 20 which opens the conduits 5 and 6, admitting the compressed air in the direction of the arrows B and C.

This air drives the polystyrene violently through the outlet 12 into the mould 22 and fills the latter; during this movement the piston reaches the upper end of the cylinder 1 which constitutes a thrust-stop.

The piston 17 is thus actuated by inverting the entry and the expulsion of the air, said piston effecting the filling of the mould by a single movement of the assembly.

The cycle continues and the rate of injection is very rapid.

In addition, the filling of the mould is accelerated by the air stream which "fluidizes" the mass of granules or beads contained in the injection chamber.

I claim:

1. A metering device for the automatic filling of a mould with expanded polystyrene, comprising an injection chamber including an inlet and an outlet for the moulding material, said injection chamber having a storing space into which the inlet opens and a metering space out of which the outlet opens, said metering space having an inlet for compressed fluid, a first valve movable in the injection chamber and capable of closing off the metering space from the storing space, a second valve for closing the outlet of the metering space when said space is in communication with the storing space and for opening said outlet when the metering space is closed off from the storing space, means constituting a direct coupling between said first and second valves to ensure their simultaneous operation, and a third valve for admission of fluid under pressure to the inlet of the metering space, said third valve being arranged to open when the first valve has closed off the metering space from the storage space.

2. A metering device for the automatic filling of a mould with expanded polystyrene, comprising an injection chamber including an inlet and an outlet for the moulding material, said injection chamber having a storing space into which the inlet opens and a metering space out of which the outlet opens, said metering space having an inlet for compressed fluid, a first valve movable in the injection chamber and capable of closing off the metering space from the storing space, a second valve for closing the outlet of the metering space when said space is in communication with the storing space and for opening said outlet when the metering space is closed off from the storing space, a common operating rod for said first and second valves to ensure their simultaneous operation, a third valve for admission of fluid under pressure to the inlet of the metering space, and a lost-motion coupling between said common operating rod and said third valve, said third valve being arranged to open when said first valve has closed off the metering space from the storage space.

3. A metering device for the automatic filling of a mould with expanded polystyrene, as claimed in claim 2, comprising a cylinder in which the third valve is movable to close and open the fluid inlet of the metering space, said cylinder having an inlet port for compressed fluid and an exhaust port, and a piston movable along said cylinder, said piston being coupled to the common operating rod.

References Cited by the Examiner

UNITED STATES PATENTS

| | | |
|---|---|---|
| 2,611,938 | 9/52 | Hansberg. |
| 2,616,130 | 11/52 | Banz. |
| 3,072,289 | 1/63 | Stopp _____ 222—453 XR |

FOREIGN PATENTS 1,024,881  2/58  Germany.

LAVERNE D. GEIGER, *Primary Examiner.*